United States Patent [19]
Pierce et al.

[11] Patent Number: 5,519,764
[45] Date of Patent: May 21, 1996

[54] CIRCUIT AND METHOD FOR DETECTING ERROR CAUSING TONES IN A VOICE MESSAGING SYSTEM

[75] Inventors: David A. Pierce, Phoenix; Barry S. Davies, Glendale, both of Ariz.

[73] Assignee: AG Communication Systems Corporation, Phoenix, Ariz.

[21] Appl. No.: 28,078

[22] Filed: Mar. 8, 1993

[51] Int. Cl.[6] .................................................. H04M 3/18
[52] U.S. Cl. ........................ 379/67; 379/77; 379/101; 379/351; 379/386
[58] Field of Search ......................... 379/1, 67, 351, 379/88, 89, 77, 101, 386

[56] References Cited

U.S. PATENT DOCUMENTS

| | | | |
|---|---|---|---|
| 4,125,865 | 11/1978 | Mohamadioun | 360/32 |
| 4,521,647 | 6/1985 | Olson et al. | 379/351 |
| 4,885,763 | 12/1989 | O'Brien et al. | 379/67 |
| 4,920,558 | 4/1990 | Hird et al. | 379/67 |
| 5,113,430 | 5/1992 | Richardson et al. | 379/88 |
| 5,172,406 | 12/1992 | Locke | 379/88 |
| 5,375,166 | 12/1994 | Odaohara | 379/97 |

*Primary Examiner*—Jeffery Hofsass
*Assistant Examiner*—Daniel S. Hunter
*Attorney, Agent, or Firm*—Gregory G. Hendricks

[57] ABSTRACT

A computer scans the voice messages for phrases that will be detected as DTMF digits and creates a record of where, when and for how long the possible problem maybe occurring. This allows prerecorded or synthesized messages from a Voice Response Announcement System to be checked for error causing DTMF digits prior to being placed into operation. The complete system consists of a computer containing the detection unit, a disk storage unit and scanning program. The Detection unit is placed within the computer and connects the system to the Central Office Switching Network for access to the Voice Response Announcement System.

13 Claims, 4 Drawing Sheets

CIRCUIT AND METHOD FOR DETECTING ERROR CAUSING TONES IN A VOICE MESSAGING SYSTEM

FIELD OF THE INVENTION

The present invention relates to a voice response system, more specifically, an arrangement for detecting error causing tones in a voice messaging system.

BACKGROUND OF THE INVENTION

With a voice response system, a telephone user uses the telephone's Dual-Tone Multi-Frequency (DTMF) keypad to communicate the user's desired actions to a Telecommunication Central Office. The Central Office receives the digits and responds with the appropriate actions. When a voice response is required for additional information, a Voice Response Announcement System is connected through the Central Office to the user.

The problem arises when speech patterns sent to the user from the Voice Response Announcement System contain audio frequencies that are similar to valid DTMF tones. These frequencies can cause the Central Office to interpret these as a valid DTMF tone and take an inappropriate action. Prior to the present invention, there was no means of testing the outgoing messages for these unintentional embedded tones.

Therefore it is the objective of the present invention to provide circuit that can screen announcement messages from the Voice Response Announcement System and determine if the messages contain tones that could be misinterpreted.

SUMMARY OF THE INVENTION

In order to accomplish the objective of the present invention there is provided a circuit for detecting an invalid tone in a voice message where the voice message is from a voice messaging system. The circuit consists of three major components.

First there is a microprocessor for recording a time and a duration of the invalid tone. The microprocessor executes a stored program and controls the basic operation of the invention. In the present embodiment, a personal computer is used.

Attached to the microprocessor is a tone generator. The tone generator generates a plurality of tones where the plurality of tones instruct the voice messaging system to transmit the voice message.

Finally, a detector is also connected to the microprocessor as well as to the voice messaging system. The detector receives the voice message from the voice messaging system and scans for an invalid tone in the voice message. If the detector finds an invalid tone, the microprocessor is signaled. Once signaled, the microprocessor records the time and duration of the invalid tone.

DESCRIPTION OF THE DRAWINGS

A better understanding of the invention may be had from the consideration of the following detailed description taken in conjunction with the accompanying drawings, in which.

DESCRIPTION OF THE PREFERRED EMBODIMENT

Figure 1:
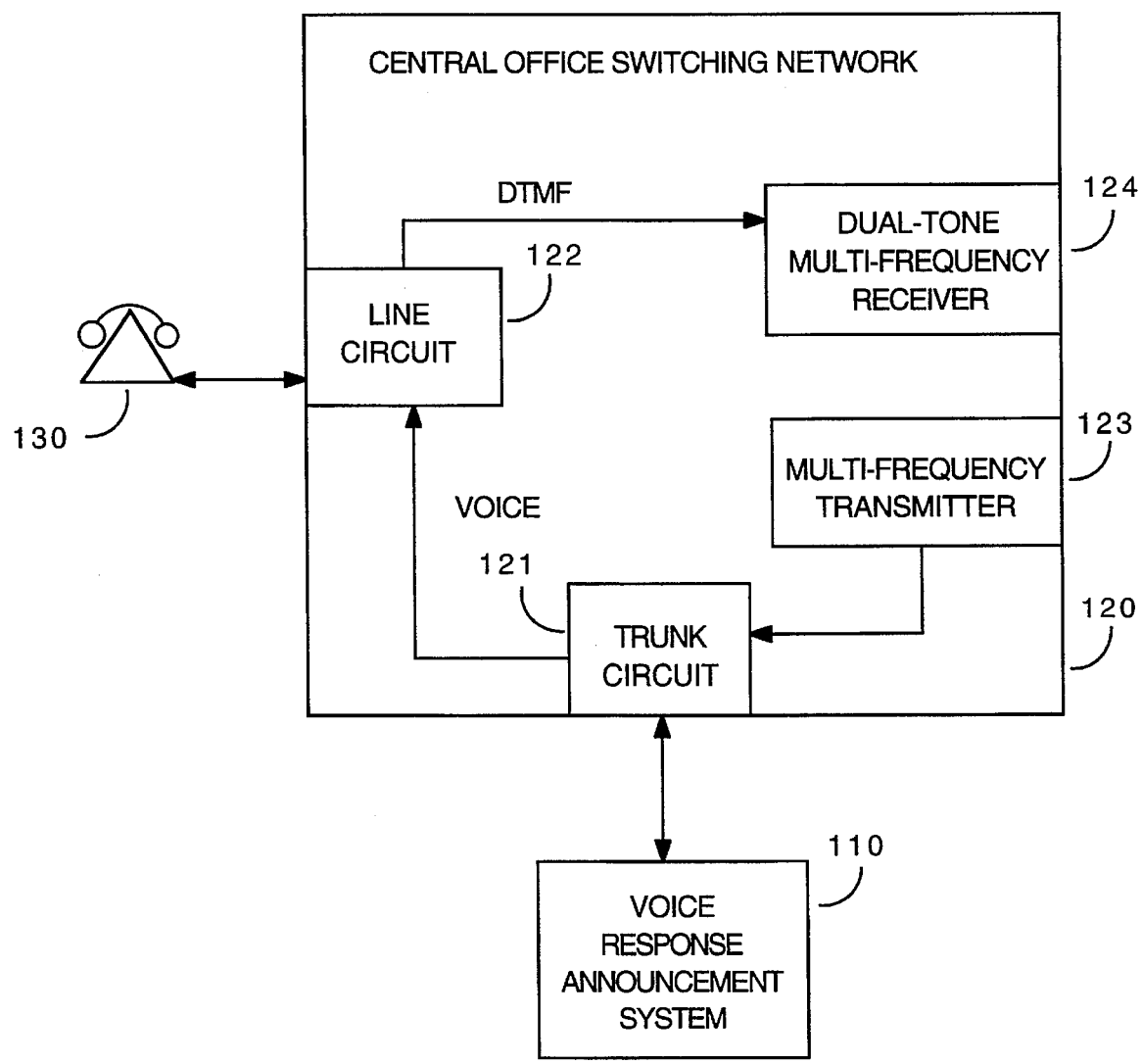
FIG. 1 is a high level block diagram showing the environment of the present invention.

Referring to FIG. 1, the present invention detects problems encountered when a Central Office Switching Network 120 and a Voice Response Announcement System 110 are used together to form an Automated Response System. The basic concept of such a system is that the end telephone user uses the telephone's 130 Dual-Tone Multi-Frequency (DTMF) keypad to communicate the user's desired actions to the Central Office Switching Network 120 through the Line Circuit 122. The Central Office Switching Network 120 receives the digits from the DTMF receiver 124 and responds with the appropriate actions. If a voice response is required for additional information or confirmation of an action, a message is routed from the Voice Response Announcement System 110 through the Trunk Circuit 121 and the Line Circuit 122 to the Telephone Instrument 130. The Voice Response Announcement System 110 is controlled by the Central Office Switching Network 120 via the Multi-Frequency (MF) Sender 123 through the Trunk Circuit 121. In another embodiment, the Voice Response Announcement System 110 may be controlled by the Office Switching Network 120 via a direct, out of band link.

Figure 2:
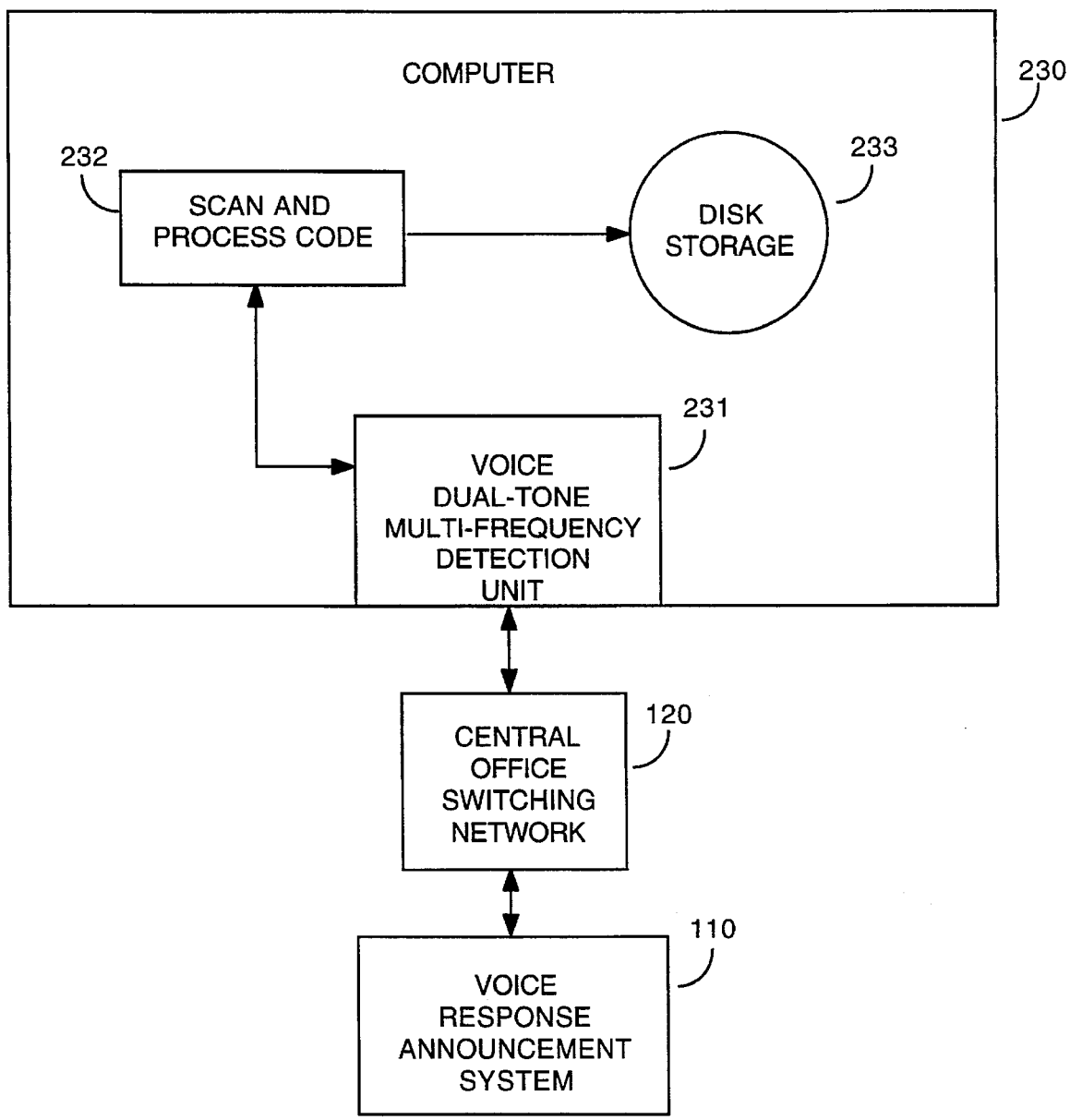
FIG. 2 shows a typical arrangement using the present invention.

The invention contained within the computer 230 of FIG. 2, scans the voice messages for phrases that will be detected as DTMF digits and creates a record of where, when and for how long the possible problem maybe occurring. This allows prerecorded or synthesized messages from the Voice Response Announcement System 110 to be checked for error causing DTMF digits prior to being placed into operation.

The complete system consists of the computer 230 containing the detection unit 231, the disk storage unit 233 and scanning program 232. Detection unit 231 is placed within the computer 230 and connects the system to the Central Office Switching Network 120 for access to the Voice Response Announcement System 110.

The computer 230 provides the hardware and operational environment for the detection unit 231, the disk storage 233 and the controlling scan and process program 232. In the present embodiment, the computer is a personal computer. This personal computer may be any kind of personal computer, the exact type or brand is inconsequential.

Figure 3:
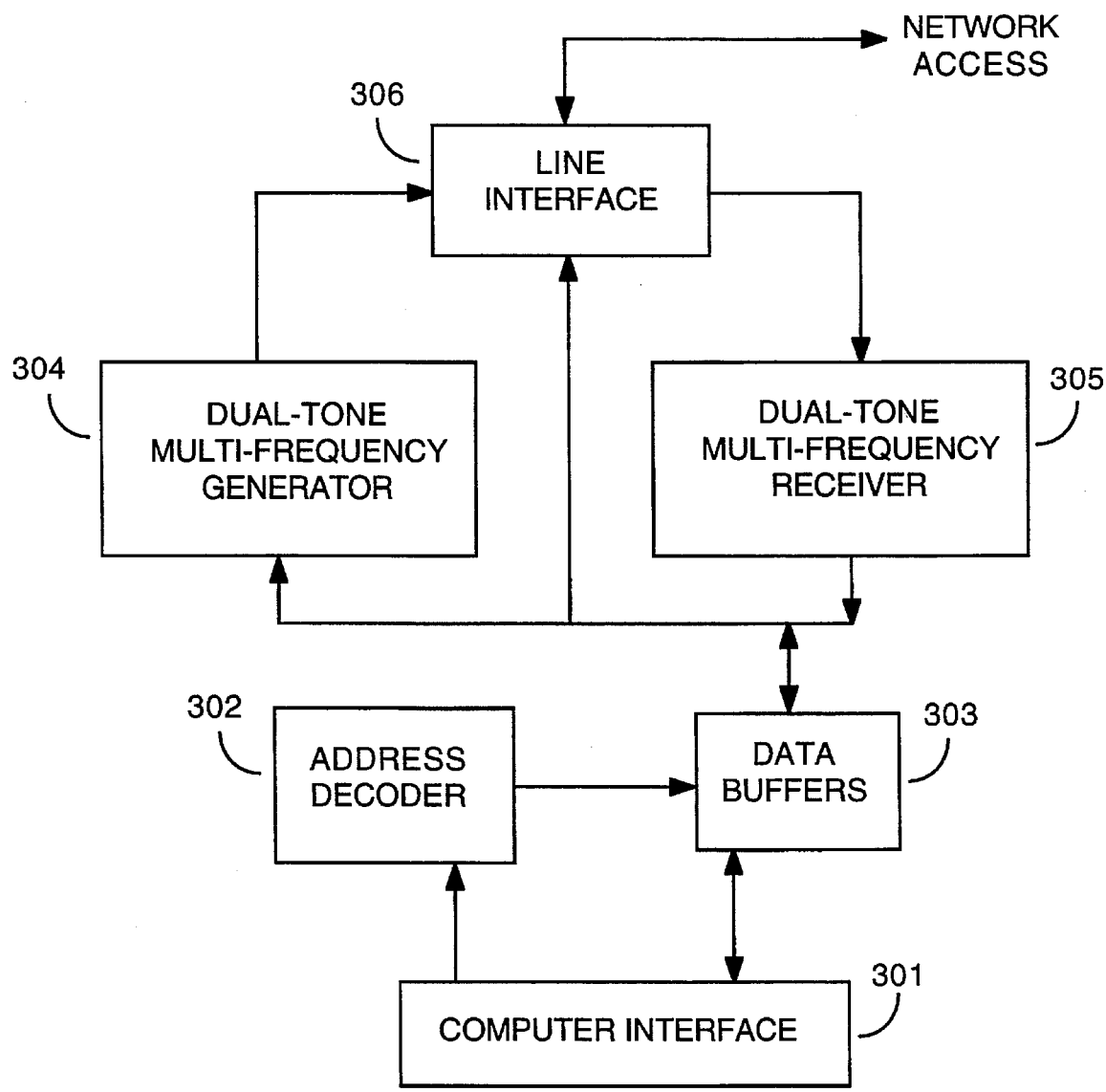
FIG. 3 is a block diagram of the preferred embodiment of the present invention.

A block diagram of Detection Unit 231 of FIG. 2 is shown in FIG. 3. Basically, the DETECTION UNIT provides the interface between the computer and its associated software and the external voice signal to be tested.

COMPUTER INTERFACE 301 buffers a standard set of address, data and control signals from the computer. The address decoding section 302 provides a defined space within the computers I/O addressing space for program access. Commands within the software access the predefined locations for controlling dialing and reading the scanned voice data. Whenever the detection unit is accessed by the software, the computer places the I/O address onto the bus. If the I/O address matches that of the detection unit, the appropriate selects are generated to enable the internal logic of the card.

One item enabled by a valid select signal is the DATA BUFFERS 303. DATA BUFFERS 303 provide a path for control and data between the detection unit and the computer. For example, data from the DTMF receiver 305 is buffered onto the bus as the program does its fast scan of the voice spectrum.

The DTMF generator 304 provides DTMF digits for control of the network and voice system using standard frequency protocol. Digits for network and message access are loaded into the dialer by the program. The commands are converted to DTMF tones for sending through the line interface to control the network and the voice response system. Thus, data is passed from the computer to the DTMF generator 304 for simulating a user dialing and requesting actions.

The DTMF receiver 305 senses any 'hidden' DTMF digits in the received voice messages by monitoring the telephone line, and thus Voice Response System. If a DTMF digit is detected in the received voice messages DTMF receiver 305 detects the presence and generates an indication. After the voice response system is accessed and the correct message is setup to playback, the receiver is placed in a fast scanning mode to attempt to detect DTMF patterns. The receiver chip is strapped for the fastest detection guard time allowed to provide a better response to any near or actual DTMF patterns that may be present. If any DTMF digits are detected in the voice message, a flag is set that can be read by software.

The line interface 306 provides loop control of the line to the network and coupling of the voice and tones to and from the DTMF sections of the circuit. The call and release of service is controlled by a set of contacts under program I/O instructions. Loop current to maintain the call is provided by a resistive network. Finally, DC isolation and AC signal coupling of the dialer and receiver to and from the network are provided by a capacitor and transformer network.

Figure 4:
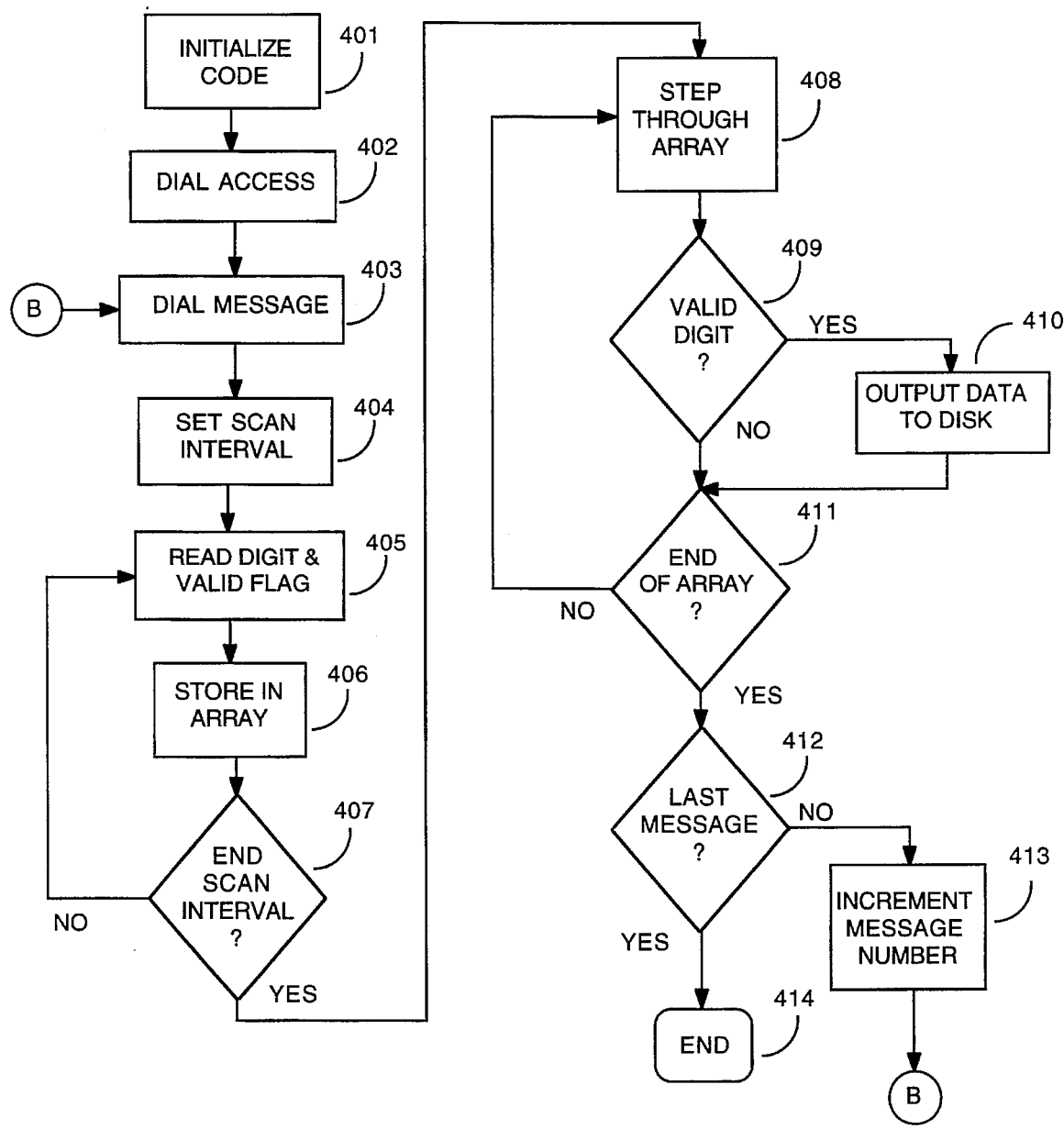
FIG. 4 is a logical flow diagram of the control program used by the present invention.

Next, referring to FIG. 4, the code initializes the detection unit and global variables (401). All input and output ports are defined and initialized to the correct status. Today's date and time are retrieved from the system and the output data file on the disk storage 233 is opened. Global data is output to the data file for identification of the run. Finally, line interface 306 is set to on-hook and all tones from the DTMF generator 304 are turned off.

A run starts by accessing the line and dialing the voice messaging system (402). Dialing is accomplished by instructing the DTMF generator 304 to output DTMF digits which access the Voice Response Announcement System 110.

Upon switching through the network the first message is activated by transmitting the correct DTMF digits (403). The Voice Response Announcement System 110 accesses and prepares to output the requested message. Next, the scan interval for each message is set and the scanning loop is entered (404). A table within the code is preloaded with the correct timing interval for each message.

The scanning loop is set for the timing interval of the DTMF receiver 305 and during each interval the detection unit sense points are read (405). To prevent limiting the minimum loop scan time, the loop writes all scan point data to an array within the computer memory (406). A check is made for the end of the scan interval (407). If the interval is not complete, the program loops to read the sense points (405).

Once the scan is complete the array of data is processed (408). Next, the array is scanned (408) for an invalid digit having been detected by the DTMF receiver 305. If a digit was detected the array is scanned (409) for the end of this invalid digit and the information as to which digit, the time within the message the digit was detected and the length of the digit are output to the data file (410). A check for the end of the array is made (411) and the code increments to the next scan index (408) or checks for the next message (412). This process is repeated for all possible messages.

Once the program has scanned all messages (414), the Voice Response Announcement System 110 is released via tones from the DTMF generator 304. The line is released by the line interface 306 and the DTMF generator 304 is turned off. The data file on the disk storage 233 is closed and control is returned to the computer operating system. Typically the output data will be viewed via the computer system 230 or printed to a hardcopy.

Although the preferred embodiment of the invention has been illustrated, and that form described, it is readily apparent to those skilled in the art that various modifications may be made therein without departing from the spirit of the invention or from the scope of the appended claims.

What is claimed is:

1. A circuit for detecting an invalid tone in a voice message where said voice message is from a voice messaging system, said circuit comprising:

a generator means connected to said voice messaging system, said generator means generates a plurality of tones where said plurality of tones instruct said voice messaging system to transmit said voice message;

a detector means connected to said voice messaging system, said detector means receives said voice message from said voice messaging system, said detector means detects said invalid tone in said voice message; and a microprocessor means for recording a time and a duration of said invalid tone, said microprocessor means connected to said generator means and said detector means, said microprocessor means controls said generator means, said microprocessor means records said time and said duration when said detector means detects said invalid tone in said voice message.

2. A circuit as claimed in claim 1 wherein said microprocessor is a personal computer.

3. A circuit for detecting an invalid tone in a voice message where said voice message is from a voice messaging system, said circuit connected to a central office means, said central office means connected to a voice response system, said voice messaging system comprised of said central office means and said voice response system, said circuit comprising:

a microprocessor means for recording a time and a duration of said invalid tone;

a first generator means connected to a line circuit means and said microprocessor means, where said line circuit resides in said central office means, said generator means under control of said microprocessor means generates a first plurality of tones;

a first decoder means connected to said line circuit, said first decoder means residing in said central office means, said first decoder receives said first plurality of tones from said first generator through said line circuit means, said first decoder means decodes said first plurality of tones into a user message;

a computer means for controlling said central office means, said computer means connected to said first decoder means, said computer means receives said user message, said computer interprets said user message and generates an announcement message;

a second generator means connected to a trunk circuit means, both said second generator means and said trunk circuit means residing in said central office means, said second generator means further connected to said computer means, said second generator means receives said announcement message and generates a second plurality of tones, said second generator means sends said second plurality of tones to said trunk circuit means;

said trunk circuit means further connected to said line circuit means and said voice response system, said trunk circuit means sends said second plurality of tones to said voice response system, in response to receiving said second plurality of tones, said voice response system transmits said voice message back to said trunk circuit means, said trunk circuit means routes said voice message to said line circuit means; and a second decoder means connected to said line circuit and said microprocessor means, said second decoder means receives said voice message from said line circuit means, said second detector means signals said microprocessor means when said invalid tone is detected in said voice message, said microprocessor means records said time and said duration when said second detector means signals said microprocessor means.

4. A circuit as claimed in claim 3 wherein said microprocessor is a personal computer.

5. A circuit as claimed in claim 3 wherein said first plurality of tones is comprised of a plurality of dual tone multi-frequency tones.

6. A circuit as claimed in claim 5 wherein said first generator means is a dual tone multi-frequency generator.

7. A circuit as claimed in claim 3 wherein said first decoder means and said second detector means are a dual tone multi-frequency receiver.

8. A circuit as claimed in claim 3 wherein said second generator means is a multi-frequency generator.

9. A method for detecting an invalid tone in a voice message where said voice message is from a voice messaging system, said method being performed by a microprocessor means, said microprocessor means being connected to said voice messaging system by a telephone line means, said method comprising the steps of:

gaining access to said voice messaging system;

requesting said voice messaging system to transmit said voice message;

determining if said voice message contains said invalid tone; and if said step of determining successfully determines that said voice message contains said invalid tone, then recording a time and a duration of said invalid tone.

10. A method for detecting an invalid tone as claimed in claim 9 wherein said step of gaining access further includes the steps of:

initializing said microprocessor means;

dialing said voice messaging system through said telephone line means;

verifying that said microprocessor means and said voice messaging system are connected through said telephone line means.

11. A method for detecting an invalid tone as claimed in claim 9 wherein said step of requesting further includes the steps of:

transmitting a plurality of tones from said microprocessor means to said voice messaging system;

receiving said plurality of tones from said microprocessor means by said voice messaging system;

interpreting said plurality of tones; and selecting said voice message from a plurality of voice messages.

12. A method for detecting an invalid tone as claimed in claim 9 wherein said step of determining is performed by a dual tone multi-frequency receiver.

13. A method for detecting an invalid tone as claimed in claim 9 wherein said step of recording is performed by said microprocessor means.

* * * * *